United States Patent
Kim et al.

(10) Patent No.: US 10,323,725 B2
(45) Date of Patent: Jun. 18, 2019

(54) PLANETARY GEAR TRAIN OF AUTOMATIC TRANSMISSION FOR VEHICLES

(71) Applicants: Hyundai Motor Company, Seoul (KR); Kia Motors Corporation, Seoul (KR)

(72) Inventors: Ki Tae Kim, Incheon (KR); Seong Wook Hwang, Gunpo-si (KR); Hyun Sik Kwon, Seoul (KR); Wonmin Cho, Hwaseong-si (KR); Jae Chang Kook, Hwaseong-si (KR); Seongwook Ji, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 66 days.

(21) Appl. No.: 15/819,534

(22) Filed: Nov. 21, 2017

(65) Prior Publication Data
US 2019/0120338 A1   Apr. 25, 2019

(30) Foreign Application Priority Data
Oct. 19, 2017 (KR) .......................... 10-2017-0135809

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC ............................................... F16H 2200/2012
See application file for complete search history.

(56) References Cited

U.S. PATENT DOCUMENTS

2016/0169343 A1*   6/2016   Cho .......................... F16H 3/66
                                                                    475/275

* cited by examiner

Primary Examiner — Timothy Hannon
(74) Attorney, Agent, or Firm — Slater Matsil, LLP

(57) ABSTRACT

A planetary gear train of an automatic transmission for a vehicle is disclosed. A planetary gear train of claim of an automatic transmission for a vehicle, includes an input shaft for receiving an external torque; an output shaft for outputting a shifted torque; a first planetary gear set having first, second, and third rotational elements; a second planetary gear set having fourth, fifth, and sixth rotational elements; a third planetary gear set having seventh, eighth, and ninth rotational elements; a fourth planetary gear set having tenth, eleventh, and twelfth rotational elements; a first shaft fixedly connected with the second rotational element, the sixth rotational element, the seventh rotational element, and the input shaft; a second shaft fixedly connected with the eleventh rotational element, and the output shaft; and a third shaft fixedly connected with the first rotational element and the tenth rotational element.

17 Claims, 2 Drawing Sheets

FIG. 2

| Shift-stage | Engagement element | | | | | | Gear ratio |
|---|---|---|---|---|---|---|---|
| | C1 | C2 | C3 | C4 | B1 | B2 | |
| D1 | | | | ● | ● | ● | 5.027 |
| D2 | ● | | | ● | | ● | 2.450 |
| D3 | ● | | | | ● | ● | 1.982 |
| D4 | ● | ● | | | | ● | 1.415 |
| D5 | ● | | ● | | | ● | 1.150 |
| D6 | ● | ● | ● | | | | 1.000 |
| D7 | | ● | ● | | | ● | 0.817 |
| D8 | | ● | ● | | ● | | 0.725 |
| D9 | | | ● | | ● | ● | 0.601 |
| D10 | | | ● | ● | ● | | 0.482 |
| REV | | ● | | ● | | ● | -4.164 |

PLANETARY GEAR TRAIN OF AUTOMATIC TRANSMISSION FOR VEHICLES

CROSS-REFERENCE TO RELATED APPLICATIONS

This application claims priority to Korean Patent Application No. 10-2017-0135809, filed in the Korean Intellectual Property Office on Oct. 19, 2017, which application is hereby incorporated herein by reference.

TECHNICAL FIELD

The present invention relates to an automatic transmission for a vehicle.

BACKGROUND

Research on realizing more shift-stages of an automatic transmission are undertaken to achieve enhancement of fuel consumption and better drivability, and recently, increase of oil price is triggering a hard competition in enhancing fuel consumption of a vehicle.

In this sense, research on an engine has been undertaken to achieve weight reduction and to enhance fuel consumption by so-called downsizing and research on an automatic transmission has been performed to simultaneously provide better drivability and fuel consumption by achieving more shift stages.

In order to achieve more shift stages for an automatic transmission, the number of parts is typically increased, which may deteriorate installability, production cost, weight and/or power flow efficiency.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is under investigation.

An automatic transmission of eight or more shift-stages typically includes three to four planetary gear sets and five to seven engagement elements (frictional elements), and may easily become lengthy, thereby deteriorating installability.

In this regard, disposing planetary gear sets in parallel or employing dog clutches instead of wet-type engagement elements is sometimes attempted. However, such an arrangement may not be widely applicable, and using dog clutches may easily deteriorate shift-feel.

The above information disclosed in this Background section is only for enhancement of understanding of the background of the invention and therefore it may contain information that does not form the prior art that is already known in this country to a person of ordinary skill in the art.

SUMMARY

The present invention relates to an automatic transmission for a vehicle. In particular embodiments, the present invention relates to a planetary gear train of an automatic transmission of a vehicle that improves power delivery performance and reduces fuel consumption by achieving ten forward speed stages using a minimum number of constituent elements, of improving silent driving using a driving point positioned at a low engine speed.

Embodiments provide a planetary gear train of an automatic transmission for a vehicle having advantages of obtaining shift-stages of ten forward speeds by minimal number of parts, improving power delivery performance and fuel consumption by multi-stages of an automatic transmission, and improving driving stability of a vehicle by utilizing a low rotation speed of an engine.

A planetary gear train according to an exemplary embodiment of the present invention may include an input shaft for receiving an external torque and an output shaft for outputting a shifted torque. A first planetary gear set has first, second, and third rotational elements and a second planetary gear set has fourth, fifth, and sixth rotational elements. A third planetary gear set has seventh, eighth, and ninth rotational elements and a fourth planetary gear set has tenth, eleventh, and twelfth rotational elements. A first shaft is fixedly connected with the second rotational element, the sixth rotational element, the seventh rotational element, and the input shaft. A second shaft fixedly is connected with the eleventh rotational element, and the output shaft. A third shaft fixedly is connected with the first rotational element and the tenth rotational element. A fourth shaft fixedly is connected with the fourth rotational element and the twelfth rotational element. A fifth shaft fixedly is connected with the fifth rotational element. A sixth shaft fixedly is connected with the eighth rotational element. Each of a plurality of shafts is selectively connected to the transmission housing and fixedly connected to a rotation element of the first and third planetary gear sets that is not fixedly connected with any of the first to sixth shafts.

The plurality of shafts may include a seventh shaft fixedly connected with the third rotational element and selectively connected with the transmission housing and in a shaft fixedly connected with the ninth rotational element and selectively connected with the transmission housing. The third shaft may be selectively connected with the fifth, the sixth shaft may be selectively connected with the seventh shaft, and the fourth shaft may be selectively connected with the sixth shaft.

The planetary gear train may further include four clutches selectively connecting two shafts among the first to the eighth shaft; and two brakes selectively connecting the seventh shaft and the eighth shaft to the transmission housing, respectively.

The three clutches may include a first clutch arranged between the third shaft and the fifth shaft; a second clutch arranged between the sixth shaft and the seventh shaft; a third clutch arranged between the fourth shaft and the sixth shaft; a fourth clutch arranged between the fifth shaft and the sixth shaft. The two brakes may include a first brake arranged between the seventh shaft and the transmission housing; and a second brake arranged between the eighth shaft and the transmission housing.

The first planetary gear set may be a single pinion planetary gear set, the first rotational element may be a first sun gear, the second rotational element may be a first planet carrier, and the third rotational element may be a first ring gear. The second planetary gear set may be a single pinion planetary gear set, the fourth rotational element may be a second sun gear, the fifth rotational element may be a second planet carrier, and the sixth rotational element may be a second ring gear. The third planetary gear set may be a single pinion planetary gear set, the seventh rotational element may be a third sun gear, the eighth rotational element may be a third planet carrier, and the ninth rotational element may be a third ring gear. The fourth planetary gear set may be a single pinion planetary gear set, the tenth rotational element may be a fourth sun gear, the eleventh rotational element may be a fourth planet carrier, and the twelfth rotational element may be a fourth ring gear.

According to an exemplary embodiment of the present invention, shift-stages of ten forward speeds and one reverse speed may be realized by combination of four planetary gear sets of simple planetary gear sets and six engagement elements.

In addition, a planetary gear train according to an exemplary embodiment of the present invention may substantially improve driving stability by realizing shift-stages appropriate for rotation speed of an engine due to multi-stages of an automatic transmission.

In addition, a planetary gear train according to an exemplary embodiment of the present invention may maximize engine driving efficiency by multi-stages of an automatic transmission, and may improve power delivery performance and fuel consumption.

Further, effects that can be obtained or expected from exemplary embodiments of the present invention are directly or suggestively described in the following detailed description. That is, various effects expected from exemplary embodiments of the present invention will be described in the following detailed description.

BRIEF DESCRIPTION OF THE DRAWINGS

FIG. 2 is an operational chart of engagement elements for respective shift-stages applied to a planetary gear train according to an exemplary embodiment of the present invention.

DETAILED DESCRIPTION OF ILLUSTRATIVE EMBODIMENTS

Figure 1:
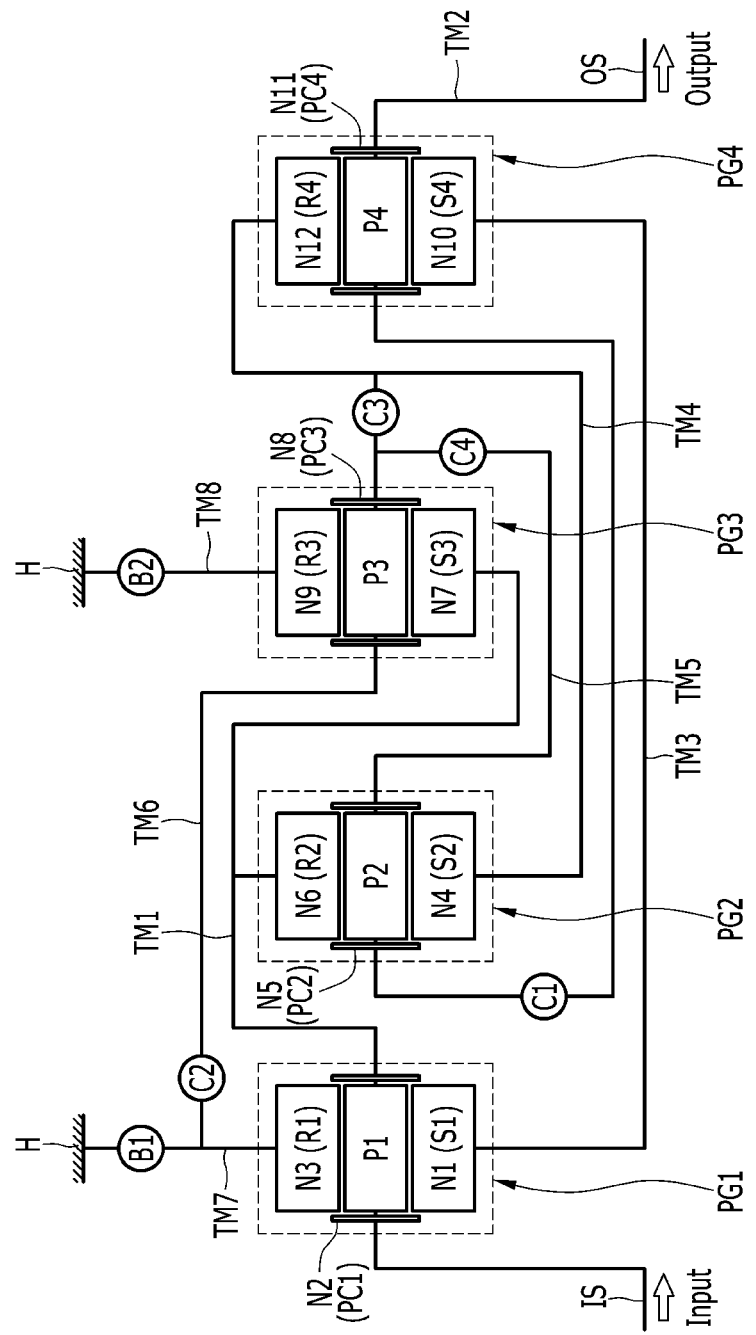
FIG. 1 is a schematic diagram of a planetary gear train according to an exemplary embodiment of the present invention.

Hereinafter, an exemplary embodiment of the present invention will be described in detail with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG. 1, a planetary gear train according to an exemplary embodiment of the present invention includes first, second, third, and fourth planetary gear set PG1, PG2, PG3, and PG4, arranged on a same axis, an input shaft IS, an output shaft OS, eight shafts TM1 to TM8 interconnecting rotational elements of the first, second, third, and fourth planetary gear set PG1, PG2, PG3, and PG4, four clutches C1 to C4 and two brakes B1 and B2 as engagement elements, and a transmission housing H.

Torque input from the input shaft IS is shifted by cooperative operation of the first, second, third, and fourth planetary gear sets PG1, PG2, PG3, and PG4, and then output through the output shaft OS.

The planetary gear sets are arranged in the order of first, second, third, and fourth planetary gear sets PG1, PG2, PG3, and PG4, from an engine side.

The input shaft IS is an input member and the torque from a crankshaft of an engine is input into the input shaft IS, after being torque-converted through a torque converter.

The output shaft OS is an output member, and being arranged on a same axis with the input shaft IS, delivers a shifted driving torque to a drive shaft through a differential apparatus (not shown).

The first planetary gear set PG1 is a single pinion planetary gear set, and includes a first sun gear S1, a first planet carrier PC1 that rotatably supports a plurality of first pinion gears P1 externally gear-meshed with the first sun gear S1, and a first ring gear R1 that is internally gear-meshed with the plurality of first pinion gears P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that rotatably supports a plurality of second pinion gears P2 externally gear-meshed with the second sun gear S2, and second ring gear R2 that is internally gear-meshed with the plurality of second pinion gears P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 that rotatably supports a plurality of third pinion gears P3 externally gear-meshed with the third sun gear S3, and a third ring gear R3 that is internally gear-meshed with the plurality of third pinion gears P3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set, and includes a fourth sun gear S4, a fourth planet carrier PC4 that rotatably supports a plurality of fourth pinion gears P4 externally gear-meshed with the fourth sun gear S4, and a fourth ring gear R4 that is internally gear-meshed with the plurality of fourth pinion gears P4. The fourth sun gear S4 acts as a tenth rotational element N10, the fourth planet carrier PC4 acts as an eleventh rotational element N11, and the fourth ring gear R4 acts as a twelfth rotational element N12.

In the arrangement of the first, second, third, and fourth planetary gear sets PG1, PG2, PG3, and PG4, the first rotational element N1 is fixedly connected with the tenth rotational element N10, the second rotational element N2 is fixedly connected with the sixth rotational element N6 and the seventh rotational element N7, and the fourth rotational element N4 is fixedly connected with the twelfth rotational element N12, by eight shafts TM1 to TM8.

The eight shafts TM1 to TM8 are hereinafter described in detail.

The first shaft TM1 is fixedly connected with the second rotational element N2 (the first planet carrier PC1), the sixth rotational element N6 (the second ring gear R2), and the seventh rotational element N7 (the third sun gear S3), and is fixedly connected with the input shaft IS thereby always acting as an input element.

The second shaft TM2 is fixedly connected with the eleventh rotational element N11 (the fourth planet carrier PC4), and is fixedly connected with the output shaft OS thereby always acting as an output element.

The third shaft TM3 is fixedly connected with the first rotational element N1 (the first sun gear S1) and the tenth rotational element N10 (the fourth sun gear S4).

The fourth shaft TM4 is fixedly connected with the fourth rotational element N4 (the second sun gear S2) and the twelfth rotational element N12 (the fourth ring gear R4).

The fifth shaft TM5 is fixedly connected with the fifth rotational element N5 (the second planet carrier PC2).

The sixth shaft TM6 is fixedly connected with the eighth rotational element N8 (the third planet carrier PC3).

The seventh shaft TM7 is fixedly connected with the third rotational element N3 (the first ring gear R1).

The eighth shaft TM8 is fixedly connected with the ninth rotational element N9 (the third ring gear R3).

Here, each of the eight shafts TM1 to TM8 may be a rotational member that fixedly interconnects the input and output shafts and rotational elements of the planetary gear sets PG1, PG2, PG3, and PG4, or may be a rotational member that selectively interconnects a rotational element to the transmission housing H, or may be a fixed member fixed to the transmission housing H.

In the disclosure, in the above description, the term "fixedly connected" or similar term means that a plurality of rotational elements including the input and output shafts, which are connected through the corresponding shafts, and the corresponding shaft are connected so as to rotate without any difference in the number of revolutions. That is, a plurality of fixedly connected rotational elements and corresponding shafts rotate in the same rotation direction and number of revolutions.

In addition, in the above description, the term "selectively connected" or similar terms means that a plurality of shafts, including an input and output shafts, are connected to each other so as to be rotatable in the same rotation direction and number of revolutions through engagement elements, or the corresponding shaft is fixedly connected to the transmission housing via the engagement element.

That is, when the engagement element operates to selectively connect a plurality of the shafts, the plurality of the shafts rotate in the same rotation direction and number of revolutions. Conversely, when the engagement element is released, the connection of the plurality of the shafts is released.

Further, when the engagement element operates to selectively connect the corresponding shaft and the transmission housing, the corresponding shaft is fixedly connected to the transmission housing. Conversely, when the engagement element is released, the corresponding shaft is in a rotatable state.

Meanwhile, the third shaft TM3 is selectively connected with the fifth shaft TM5, and the sixth shaft TM6 is selectively connected with the fourth shaft TM4, the fifth shaft TM5, and the seventh shaft TM7, respectively.

In addition, the seventh shaft TM7 and the eighth shaft TM8 are selectively connected with the transmission housing H.

The eight shafts TM1 to TM8, the input shaft IS, and the output shaft OS may be selectively interconnected with one another by engagement elements of four clutches C1, C2, C3, and C4.

The eight shafts TM1 to TM8 may be selectively connected with the transmission housing H, by engagement elements of two brakes B1 and B2.

The six engagement element of the four clutches C1 to C4 and the two brakes B1 and B2 are arranged as follows.

The first clutch C1 is arranged between the third shaft TM3 and the fifth shaft TM5, and selectively connects the third shaft TM3 and the fifth shaft TM5, thereby controlling power delivery therebetween.

The second clutch C2 is arranged between the sixth shaft TM6 and the seventh shaft TM7, and selectively connects the sixth shaft TM6 and the seventh shaft TM7, thereby controlling power delivery therebetween.

The third clutch C3 is arranged between the fourth shaft TM4 and the sixth shaft TM6, and selectively connects the fourth shaft TM4 and the sixth shaft TM6, thereby controlling power delivery therebetween.

The fourth clutch C4 is arranged between the fifth shaft TM5 and the sixth shaft TM6, and selectively connects the fifth shaft TM5 and the sixth shaft TM6, thereby controlling power delivery therebetween.

The first brake B1 is arranged between the seventh shaft TM7 and the transmission housing H, and selectively connects the seventh shaft TM7 to the transmission housing H.

The second brake B2 is arranged between the eighth shaft TM8 and the transmission housing H, and selectively connects the eighth shaft TM8 to the transmission housing H.

The respective engagement elements of the first, second, third and fourth clutches C1, C2, C3, and C4 and the first and second brakes B1 and B2 may be realized as multi-plate hydraulic pressure friction devices that are frictionally engaged by hydraulic pressure, it should not be understood to be limited thereto. Meanwhile, the engagement element is any of a dog clutch, an electric clutch, and a magnetic particle clutch, the like which may be automatically controlled, and may be adopted.

FIG. 2 is an operational chart of engagement elements for respective shift-stages applied to a planetary gear train according to an exemplary embodiment of the present invention.

Referring to FIG. 2, a planetary gear train according to an exemplary embodiment of the present invention realizes ten forward speeds and one reverse speed by operating four engagements among the first, second, third, and four clutches C1, C2, C3, and C4 and first, and second brakes B1, and B2

In the forward first speed shift-stage D1, the fourth clutch C4 and the first, and second brakes B1 and B2 are simultaneously operated.

As a result, the fifth shaft TM5 is connected with the sixth shaft TM6 by the operation of the fourth clutch C4. In this state, the torque of the input shaft IS is input to the first shaft TM1.

In addition, the seventh shaft TM7 and the eighth shaft TM8 respectively act as fixed elements by the operation of the first and second brakes B1 and B2, thereby realizing the forward first speed by cooperative operation of respective shafts and outputting a shifted torque to the output shaft OS connected with the second shaft TM2.

In the forward second speed shift-stage D2, the first and fourth clutches C1 and C4 and the first brake B1 are simultaneously operated.

As a result, the third shaft TM3 is fixedly connected with the fifth shaft TM5 by the operation of the first clutch C1, and the fifth shaft TM5 is fixedly connected with the sixth shaft TM6 by the operation of the fourth clutch C4. In this state, the torque of the input shaft IS is input to the first shaft TM1.

In addition, the eighth shaft TM8 acts as a fixed element by the operation of the second brake B2, thereby realizing the forward second speed by cooperative operation of respective shafts and outputting a shifted torque to the output shaft OS connected with the second shaft TM2.

In the forward third speed shift-stage D3, the first clutch C1 and the first and second brakes B1 and B2 are simultaneously operated.

As a result, the third shaft TM3 is fixedly connected with the fifth shaft TM5 by the operation of the first clutch C1. In this state, the torque of the input shaft IS is input to the first shaft TM1.

In addition, the seventh shaft TM7 and the eighth shaft TM8 respectively act as fixed elements by the operation of the first and second brakes B1 and B2, thereby realizing the forward third speed by cooperative operation of respective shafts and outputting a shifted torque to the output shaft OS connected with the second shaft TM2.

In the forward fourth speed shift-stage D4, the first and second clutches C1 and C2 and the second brake B2 are simultaneously operated.

As a result, the third shaft TM3 is fixedly connected with the fifth shaft TM5 by the operation of the first clutch C1, and the sixth shaft TM6 is fixedly connected with the seventh shaft TM7 by operation of the second clutch C2. In this state, the torque of the input shaft IS is input to the first shaft TM1.

In addition, the eighth shaft TM8 acts as a fixed element by the operation of the second brake B2, thereby realizing the forward fourth speed by cooperative operation of respective shafts and outputting a shifted torque to the output shaft OS connected with the second shaft TM2.

In the forward fifth speed shift-stage D5, the first and third clutches C1 and C3 and the second brake B2 are simultaneously operated.

As a result, the third shaft TM3 is fixedly connected with the fifth shaft TM5 by the operation of the first clutch C1, and the fourth shaft TM4 is fixedly connected with the sixth shaft TM6 by operation of the third clutch C3. In this state, the torque of the input shaft IS is input to the first shaft TM1.

In addition, the eighth shaft TM8 acts as fixed element by the operation of the second brake B2, thereby realizing the forward fifth speed by cooperative operation of respective shafts and outputting a shifted torque to the output shaft OS connected with the second shaft TM2.

In the forward sixth speed shift-stage D6, the first, second, and thrid clutches C1, C2, and C3 are simultaneously operated.

As a result, the third shaft TM3 is fixedly connected with the fifth shaft TM5 by the operation of the first clutch C1, the sixth shaft TM6 is fixedly connected with the seventh shaft TM7 by operation of the second clutch C2, and the fourth shaft TM4 is fixedly connected with the sixth shaft TM6 by operation of the third clutch C3.

Then, the first, second, third, and fourth planetary gear sets PG1, PG2, PG3, and PG4 integrally rotate, and the torque received at the first shaft TM1 is outputted as inputted, thereby realizing the forward sixth speed and outputting a shifted torque through the output shaft OS connected with the second shaft TM2.

In the forward seventh speed shift-stage D7, the second and third clutches C2 and C3 and the second brake B2 are simultaneously operated.

As a result, the sixth shaft TM6 is fixedly connected with the seventh shaft TM7 by operation of the second clutch C2, and the fourth shaft TM4 is fixedly connected with the sixth shaft TM6 by operation of the third clutch C3. In this state, the torque of the input shaft IS is input to the first shaft TM1.

In addition, the eighth shaft TM8 acts as fixed element by the operation of the second brake B2, thereby realizing the forward seventh speed by cooperative operation of respective shafts and outputting a shifted torque to the output shaft OS connected with the second shaft TM2.

In the forward eighth speed shift-stage D8, the second and third clutches C2 and C3 and the first brake B1 are simultaneously operated.

As a result, the sixth shaft TM6 is fixedly connected with the seventh shaft TM7 by operation of the second clutch C2, and the fourth shaft TM4 is fixedly connected with the sixth shaft TM6 by operation of the third clutch C3. In this state, the torque of the input shaft IS is input to the first shaft TM1.

In addition, the seventh shaft TM7 acts as fixed element by the operation of the first brake B1, thereby realizing the forward eighth speed by cooperative operation of respective shafts and outputting a shifted torque to the output shaft OS connected with the second shaft TM2.

In the forward ninth speed shift-stage D9, the third clutch C3 and the first and second brakes B1 and B2 are simultaneously operated.

As a result, the fourth shaft TM4 is fixedly connected with the sixth shaft TM6 by operation of the third clutch C3. In this state, the torque of the input shaft IS is input to the first shaft TM1.

In addition, the seventh shaft TM7 and the eighth shaft TM8 respectively act as fixed elements by the operation of the first and second brakes B1 and B2, thereby realizing the forward ninth speed by cooperative operation of respective shafts and outputting a shifted torque to the output shaft OS connected with the second shaft TM2.

In the forward tenth speed shift-stage D10, the third and fourth clutches C3 and C4 and the first brake B1 are simultaneously operated.

As a result, the fourth shaft TM4 is fixedly connected with the sixth shaft TM6 by operation of the third clutch C3, and the fifth shaft TM5 is fixedly connected with the sixth shaft TM6 by the operation of the fourth clutch C4. In this state, the torque of the input shaft IS is input to the first shaft TM1.

In addition, the seventh shaft TM7 acts as a fixed element by the operation of the first brake B1, thereby realizing the forward tenth speed by cooperative operation of respective shafts and outputting a shifted torque to the output shaft OS connected with the second shaft TM2.

In the reverse speed REV, the second and fourth clutches C2 and C4, and the second brake B2 are simultaneously operated.

As a result, the sixth shaft TM6 is fixedly connected with the seventh shaft TM7 by operation of the second clutch C2, and the fifth shaft TM5 is connected with the sixth shaft TM6 by the operation of the fourth clutch C4. In this state, the torque of the input shaft IS is input to the first shaft TM1.

In addition, the eighth shaft TM8 acts as a fixed element by the operation of the second brake B2, thereby realizing the reverse speed by cooperative operation of respective shafts and outputting a shifted torque to the output shaft OS connected with the second shaft TM2.

As described above, a planetary gear train according to an exemplary embodiment of the present invention may realize at least ten forward speeds and at least one reverse speed by operating four planetary gear sets PG1, PG2, PG3, and PG4 by controlling the four clutches C1, C2, C3, and C4 and the two brakes B1 and B2.

In addition, a planetary gear train according to an exemplary embodiment of the present invention may realize shift stages appropriate for rotation speed of an engine due to multi-stages of an automatic transmission and improve driving stability of a vehicle by utilizing a low rotation speed of an engine.

In addition, a planetary gear train according to an exemplary embodiment of the present invention maximize engine driving efficiency by multi-stages of an automatic transmission, and may improve power delivery performance and fuel consumption.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, comprising:
   an input shaft;
   an output shaft;
   a first planetary gear set having first, second, and third rotational elements;
   a second planetary gear set having fourth, fifth, and sixth rotational elements;
   a third planetary gear set having seventh, eighth, and ninth rotational elements;
   a fourth planetary gear set having tenth, eleventh, and twelfth rotational elements;
   a first shaft fixedly connected with the second rotational element, the sixth rotational element, the seventh rotational element, and the input shaft;
   a second shaft fixedly connected with the eleventh rotational element and the output shaft;
   a third shaft fixedly connected with the first rotational element and the tenth rotational element;
   a fourth shaft fixedly connected with the fourth rotational element and the twelfth rotational element;
   a fifth shaft fixedly connected with the fifth rotational element;
   a sixth shaft fixedly connected with the eighth rotational element; and
   a plurality of additional shafts, each additional shaft being selectively connected to a transmission housing and fixedly connected to a rotation element of the first and third planetary gear sets that is not fixedly connected with any of the first to sixth shafts.

2. The planetary gear train of claim 1, wherein the plurality of additional shafts comprise:
   a seventh shaft fixedly connected with the third rotational element and selectively connected with the transmission housing; and
   an eighth shaft fixedly connected with the ninth rotational element and selectively connected with the transmission housing.

3. The planetary gear train of claim 2, wherein the third shaft is selectively connected with the fifth, the sixth shaft is selectively connected with the seventh shaft, and the fourth shaft is selectively connected with the sixth shaft.

4. The planetary gear train of claim 3, further comprising four clutches selectively connecting two shafts among the first to the eighth shafts.

5. The planetary gear train of claim 4, further comprising a first brake selectively connecting the seventh shaft to the transmission housing and a second brake selectively connecting the eighth shaft to the transmission housing.

6. The planetary gear train of claim 3, further comprising a first brake selectively connecting the seventh shaft to the transmission housing and a second brake selectively connecting the eighth shaft to the transmission housing.

7. The planetary gear train of claim 3, further comprising:
   a first clutch arranged between the third shaft and the fifth shaft;
   a second clutch arranged between the sixth shaft and the seventh shaft;
   a third clutch arranged between the fourth shaft and the sixth shaft;
   a fourth clutch arranged between the fifth shaft and the sixth shaft;
   a first brake arranged between the seventh shaft and the transmission housing; and
   a second brake arranged between the eighth shaft and the transmission housing.

8. The planetary gear train of claim 1, wherein:
   the first planetary gear set is a single pinion planetary gear set, the first rotational element is a first sun gear, the second rotational element is a first planet carrier, and the third rotational element is a first ring gear;
   the second planetary gear set is a single pinion planetary gear set, the fourth rotational element is a second sun gear, the fifth rotational element is a second planet carrier, and the sixth rotational element is a second ring gear;
   the third planetary gear set is a single pinion planetary gear set, the seventh rotational element is a third sun gear, the eighth rotational element is a third planet carrier, and the ninth rotational element is a third ring gear; and
   the fourth planetary gear set is a single pinion planetary gear set, the tenth rotational element is a fourth sun gear, the eleventh rotational element is a fourth planet carrier, and the twelfth rotational element is a fourth ring gear.

9. A planetary gear train of an automatic transmission for a vehicle, comprising:
   an input shaft for receiving an external torque;
   an output shaft for outputting a shifted torque;
   a first planetary gear set having first, second, and third rotational elements;
   a second planetary gear set having fourth, fifth, and sixth rotational elements;
   a third planetary gear set having seventh, eighth, and ninth rotational elements;
   a fourth planetary gear set having tenth, eleventh, and twelfth rotational elements;
   wherein the first rotational element is fixedly connected with the tenth rotational element;
   wherein the second rotational element is fixedly connected with the sixth rotational element, the seventh rotational element, and the input shaft;
   wherein the third rotational element is selectively connected with a transmission housing;
   wherein the fourth rotational element is fixedly connected with the twelfth rotational element;
   wherein the fifth rotational element is selectively connected with the eleventh rotational element;
   wherein the eighth rotational element is selectively connected with the third rotational element, the fourth rotational element, and the fifth rotational element, respectively;
   wherein the ninth rotational element is selectively connected with the transmission housing; and
   wherein the eleventh rotational element is fixedly connected with the output shaft.

10. The planetary gear train of claim 9, further comprising four clutches selectively connecting two rotational elements among the first to the twelfth rotational elements.

11. The planetary gear train of claim 10, further comprising two brakes selectively connecting the third rotational element and the ninth rotational element to the transmission housing, respectively.

12. The planetary gear train of claim 10, wherein:
the first planetary gear set is a single pinion planetary gear set, the first rotational element is a first sun gear, the second rotational element is a first planet carrier, and the third rotational element is a first ring gear;
the second planetary gear set is a single pinion planetary gear set, the fourth rotational element is a second sun gear, the fifth rotational element is a second planet carrier, and the sixth rotational element is a second ring gear;
the third planetary gear set is a single pinion planetary gear set, the seventh rotational element is a third sun gear, the eighth rotational element is a third planet carrier, and the ninth rotational element is a third ring gear; and
the fourth planetary gear set is a single pinion planetary gear set, the tenth rotational element is a fourth sun gear, the eleventh rotational element is a fourth planet carrier, and the twelfth rotational element is a fourth ring gear.

13. The planetary gear train of claim 9, further comprising:
a first clutch arranged between the fifth rotational element and the eleventh rotational element;
a second clutch arranged between the third rotational element and the eighth rotational element;
a third clutch arranged between the fourth rotational element and the eighth rotational element;
a fourth clutch arranged between the fifth rotational element and the eighth rotational element;
a first brake arranged between the third rotational element and the transmission housing; and
a second brake arranged between the ninth rotational element and the transmission housing.

14. A planetary gear train of an automatic transmission for a vehicle, comprising:
an input shaft;
an output shaft;
a first single pinion planetary gear set having a first sun gear, a first planet carrier, and a first ring gear;
a second single pinion planetary gear set having a second sun gear, a second planet carrier, and a second ring gear;
a third single pinion planetary gear set having a third sun gear, a third planet carrier, and a third ring gear; and
a fourth single pinion planetary gear set having a fourth sun gear, a fourth planet carrier, and a fourth ring gear;
a first shaft fixedly connected with the first planet carrier, the second ring gear, the third sun gear, and the input shaft;
a second shaft fixedly connected with the fourth planet carrier and the output shaft;
a third shaft fixedly connected with the a first sun gear and the fourth sun gear;
a fourth shaft fixedly connected with the second sun gear and the fourth ring gear;
a fifth shaft fixedly connected with the second planet carrier; and
a sixth shaft fixedly connected with the third planet carrier.

15. The planetary gear train of claim 14, further comprising:
a first clutch arranged between the third shaft and the fifth shaft;
a second clutch arranged between the sixth shaft and a seventh shaft;
a third clutch arranged between the fourth shaft and the sixth shaft; and
a fourth clutch arranged between the fifth shaft and an eighth shaft.

16. The planetary gear train of claim 15, further comprising:
a transmission housing;
a first brake arranged between the seventh shaft and the transmission housing; and
a second brake arranged between the eighth shaft and the transmission housing.

17. The planetary gear train of claim 14, further comprising:
a transmission housing;
a first brake arranged between the seventh shaft and the transmission housing; and
a second brake arranged between the eighth shaft and the transmission housing.

* * * * *